United States Patent [19]

D'Obrenan et al.

[11] Patent Number: 5,490,869
[45] Date of Patent: Feb. 13, 1996

[54] PROCESS AND DEVICE FOR TREATING POLLUTANT, FUSIBLE MATERIALS

[75] Inventors: Jean V. D'Obrenan, Le Chesnay; Nicole Madigou, Montrouge; Thierry Deriaud, Guebwiller, all of France

[73] Assignees: Promethee, Puteaux; Soretel, Cergy-Pontoise; Constructions Electriques Celes, Lautenbach, all of France

[21] Appl. No.: 302,907

[22] PCT Filed: Mar. 18, 1993

[86] PCT No.: PCT/FR93/00276

§ 371 Date: Sep. 20, 1994

§ 102(e) Date: Sep. 20, 1994

[87] PCT Pub. No.: WO93/18868

PCT Pub. Date: Sep. 30, 1993

[30] Foreign Application Priority Data

Mar. 20, 1992 [FR] France .................................. 92 03407

[51] Int. Cl.$^6$ ........................................................ C21B 3/04
[52] U.S. Cl. ............................................. 75/10.14; 75/10.15
[58] Field of Search ................................. 75/10.14, 10.15

[56] References Cited

U.S. PATENT DOCUMENTS 4,762,554  8/1988  Lazcano-Navarro ................... 75/10.15

FOREIGN PATENT DOCUMENTS

| 0265051 | 4/1988 | European Pat. Off. . |
| 0335033 | 10/1989 | European Pat. Off. . |
| 0349405 | 1/1990 | European Pat. Off. . |
| 0417520 | 3/1991 | European Pat. Off. . |
| 0437679 | 7/1991 | European Pat. Off. . |
| 1430192 | 3/1966 | France . |
| 2589228 | 4/1987 | France . |

OTHER PUBLICATIONS

VGB–Konferenz "Rückstände aus der Müllverbrennung", *VGB Kraftwerkstechnik* 70(5) May 3–4, 1990, pp. 428–430.

*Primary Examiner*—Peter D. Rosenberg
*Attorney, Agent, or Firm*—William S. Frommer

[57] ABSTRACT

The invention relates to a process and device for treating pollutant fusible materials which are conductors of electricity in the molten state. The process consists in introducing the waste into an induction furnace (11, 40) comprising an inductor circuit (1, 39), and a crucible (1, 8; 38), directly heating the said materials in the crucible by induction so that they melt, induction being created by the inductor circuit (1, 39) galvanically connected to a power source (6), the crucible (1, 8; 38) being the seat of no eddy current, removing the molten products from the furnace, the said products being gathered, after cooling, in non-leachable form.

32 Claims, 4 Drawing Sheets

PROCESS AND DEVICE FOR TREATING POLLUTANT, FUSIBLE MATERIALS

This invention relates to a process and device for treating pollutant materials, which are fusible and conductors of electricity in the molten state. This process and this device are specially dedicated to municipal solid waste incineration fly ash which are extracted after fumes treatment.

Ever stricter environment protection regulations are now leading to improvements in techniques for treating fumes released by the burning of fossil fuels and the incineration of industrial, urban and hospital waste.

Household waste incinerators are subject to regulations, especially regarding the quality of fumes released into the atmosphere.

Untreated household incinerator fumes contain a significant amount of dust, metals, hydrochloric acid, etc., raising the need for fume purification systems.

Conventional fume purification systems are dedusters, in particular, bag filters and electrostatic or cyclone separators. These systems are designed to strip the hot fumes of solid particles carried by the fumes or formed by condensation of volatile chemical elements or compounds on dust particles.

In addition, the new standards relating to the quality of fumes have lead to the installation of equipment designed to remove hydrochloric acid from fumes. This equipment employs a base (generally lime) that causes the hydrochloric acid to precipitate in the form of calcium chloride, which is then recovered in the dust or wash water. A number of dechlorination techniques are available including the wet, semi-wet, dry and condensation processes. These techniques produce powders of different qualities. The residue collected in the condensation process is dry and contains hardly any chloride. The residue from the wet process also contains very little chloride (about 2%) but has a high moisture content (up to 60%). In the wet process, the chlorides are dissolved in the wash water which is then discharged into a river or sea, according to regulations. The residues from the semi-wet and dry processes have a high chloride content (about 25%) together with a reagent excess.

The residue collected by dedusters may also contain a significant amount of chloride (approximately 10%). These residues also have a significant heavy metal content.

The elimination of these residues generated by the gases scrubbing of Municipal Solid Waste incineration (REMSW) is now regulated owing to their toxic nature. This is because certain elements, especially metals and chlorides, are likely to be leached when dumped and thus pollute the ground water table. Leaching tests conducted on these residues reveal that the amounts of chloride ions, lead and cadmium in the leacher are far above the maximum acceptable thresholds for urban waste dumping in France and the amounts of chloride ions, lead and cadmium in these residues even exceed the levels set in European Community directives governing hazardous waste.

It is therefore vitally important to envisage treatment processes to make these residues non-reachable, a number of which have already been developed.

One of these is the DEGLOR process developed by the ABB company which is designed to treat filter dust collected by conventional fume purification systems. In this process, the dust is heated to over 1300° C. in an electric melting furnace. Toxic dioxins are destroyed at these high temperatures, this dust also forms a liquid slag and gives off heavy metal vapors. The fumes containing these metals are sucked out and vigorously cooled causing the metal compounds to condense; the dust recovered downstream of the cooling stage contains a high proportion of these metals which can be commercially upgraded. The decontaminated dust is vitrified to obtain a non-leachable material that can be stored in normal depots or used in the building and public works industry.

This process, however, presents many drawbacks. First, the refractory lining required is generally expensive and requires periodical replacement. The lining may become impregnated with toxic products and itself pollute. The lifetime of the furnace heating elements is also relatively short, and such a furnace cannot generate very high temperatures, with a general limit of 1800° C. Also, hot spots of the slag surface can lead to the release of a larger quantity of chlorinated and metallic compounds.

The KRUPP MAK system is also designed to treat filter dust. It employs a plasma type melting process in which high temperatures generated by electric arcs, possibly over 2000° C., melt the dust before it enters the melting bath, thus destroying the organic substances. Most of the dust is transformed into a liquid slag which, if correctly cooled, leads a non-leachable material that can be recycled to the building sector. The volatile acid and heavy metal compounds are converted to gas and processed to condense and solidify as salt and heavy metal compounds. The concentrate obtained can be reprocessed.

This process also has drawbacks due to the presence of a refractory vessel and electrode wear. It is also difficult to accurately control the furnace temperature in this process. Hot spots appear causing the release of a larger quantity of volatile heavy metals and chlorinated compounds. This process also requires the addition of gas, thereby increasing the volume of fumes to be treated, which in turn makes it necessary to install high-capacity fume purification equipment.

Also worth mentioning is the SOLUR process of vitrification using a submerged electrode furnace. Part of the metal oxides are trapped in the bath. The temperature of the bath is raised to between 1300° and 1400° C., and the bath tapped by overflow. The charge obtained is a mixture of REMSW, sand and phonelite.

This process, like those mentioned above, also has drawbacks since it also requires a refractory vessel and the use of electrodes needing frequent replacement. It also causes hot spots resulting in the release of an even larger quality to chlorinated compounds and volatile heavy metals.

All these processes also have relatively high operating costs.

Treatment processes are also known which have been developed to process other types of products of varying toxicity.

These processes use induction heating means which generate heat in the mass to be melted down by induction. Such heating means avoid the formation of hot spots which result in unwanted chemical reactions that release pollutant compounds or chemical elements. They therefore have advantages over the processes described above.

Patent EP-A-0 265 051 describes a process and device for processing asbestos. This process consists in destroying the fibrous structure of the asbestos by melting it in a zone heated by induction. Heating is provided by an induction furnace comprising a graphite crucible designed to receive the asbestos and windings to heat the crucible.

Heat is transmitted towards the product to be treated by thermal conductance from the wall of the crucible. It is this single wall which is the seat of the eddy currents, the heat given off by the wall is transmitted to the mass to be heated by conduction with losses.

Thus, the process and device described in this document have drawbacks in terms of efficiency since it results in electrical and thermal losses.

Patent EP-A-0 349 405 relates to a process and installation for melting by induction a highly corrosive material or one having a very high melting point such as oxides, glass and certain metals. The melting process is initially started by a microwave field. Indeed, if the material is not a conductor of electricity when cold, it cannot be the seat of eddy currents allowing it to be directly heated by induction. However, because it is dielectric, it is likely to heat up through dielectric losses under the effect of UHF electromagnetic fields, this is the case of oxides and glass, and of the slag sometimes associated with metals.

The material is heated by a segmented, cooled, metal crucible.

This type of crucible has the advantage of not requiring refractory material to protect the walls. Indeed, a thin layer of solidified material forms on contact with the cold wall thus protecting the crucible from chemical attack.

However, the efficiency obtained with this crucible is relatively low.

Indeed, the crucible is made up of metal segments which are conductors of electricity and isolated from each other, and a surrounding inductor. The inductor creates a high-frequency magnetic field. Each sector of the crucible is the seat of eddy currents and acts as a short-circuited transformer secondary creating a high-frequency field towards the inside of the crucible. The combination of the fields emitted by the sectors transfers heat by induction to the core of the mass to be processed. The segments of the crucible are the seat of losses which are removed by the crucible's cooling liquid and contribute hardly any heat to the mass to be processed.

These losses result in an efficiency of only approximately 60%.

Patent FR-2 589 228 relates to a device for continuously producing materials obtained from substances in a molten state, and which also uses a segmented, cold crucible surrounded by a solenoid. This device therefore has the same drawbacks as the device described in document EP-A-349 405.

Note also that the price of induction furnaces comprising a segmented, cold crucible is relatively high and presents risks when in operation (short-circuit, etc.). Moreover, their size to date is limited.

The object of the invention is therefore to propose a process for treating toxic materials that are fusible and conductors of electricity in the molten state, and which overcomes the problems associated with known treatment processes and devices in terms of cost, efficiency and safety in use, while at the same time not imposing use of a refractory lining and providing accurate control of the temperature of the fusion bath in order to minimize the release of chlorine and volatile heavy metals.

The invention therefore relates to a process for treating pollutant materials that are fusible and conductors of electricity in the molten state, wherein:

said materials are introduced into an induction furnace comprising an inductor circuit and a crucible, said materials are directly heated by induction in the said crucible to ensure their melting, the induction being created by the inductor circuit which is galvanically connected to a power source, the crucible being the seat of no eddy current, the molten products are removed from said furnace, the said products being collected, after cooling, in non-leachable form, Preferably, the said materials are fed into the furnace and molten products tapped from the furnace in continuous way.

Preferably, if the materials are only partly or not at all self-fluxing, particularly if they contain a high proportion of chlorine, the process consists in introducing additives acting as flux to ensure and/or enhance homogenous melting of the waste, thus allowing the formation of a final, homogeneous, non leachable product.

In accordance with the process of the invention, a solid crust is formed on the surface of the bath which makes it possible to trap at least a part of the volatile elements, particularly the metals.

In accordance with one particular embodiment of the process of the invention, the furnace is operated in a controlled atmosphere in order to reduce leaks of hazardous gas and correctly control chemical reactions occurring in the furnace.

Preferably, the process also consists in treating the fumes leaving the furnace.

In accordance with a first embodiment, the fume treatment process consists in first eliminating inflammable gases formed in the furnace and then recovering the metal compounds present in the fumes released by the furnace.

In accordance with a second variant, the formation of metal oxides is prevented during melting and the corresponding metals are directly recovered.

Preferably, if the process leads to the formation of acids, the acids are dissolved by scrubbing the gas and recovered in the form of salt.

In accordance with a particular embodiment of the process of the invention, means can also be provided for purifying the released gas.

In accordance with a second embodiment, the fume treatment process consists in cooling the gases and recovering the dust and condensable compounds, the fumes then being sent to an existing fume purification system.

If the process is used for waste, this type of treatment is advantageously carried out when the process is implemented on the same site as the incineration plant.

The invention also relates to a device for treating pollutant materials that are fusible and conductor of electricity in the molten state, comprising:

means for feeding materials and possibly additives, an induction furnace comprising a crucible and an inductor circuit galvanically connected to a power source, said furnace directly heating the said materials by induction to ensure their melting, the crucible being the seat of no eddy current, means for removing the molten products, which are collected after cooling, in non-leachable form, an installation for treating the fumes released by the furnace.

Preferably, the induction furnace is characterized by the formation and the, at least partial, maintenance of a solidified skin around the fusion bath which is isoled on its outer walls.

In accordance with a first embodiment, the furnace comprises a metal coil that is a conductor of electricity, said coil being connected to a medium-frequency current generator, and possibly to reactive energy compensating means, as well as a bottom, the coil and the bottom being cooled by an appropriate system.

According to a variant, a wall made from refractory material that is not conductive of electricity in the solid state is placed on the inner wall of the coil.

According to a second embodiment, the furnace comprises a crucible made from refractory material and which is not a conductor of electricity in the solid state, and inductor means arranged around said crucible.

To make it possible to operate the furnace in a controlled atmosphere, the furnace comprises a cover in addition to ducts for respectively feeding the waste, removing the gas released during the melting of the waste and for injecting the gas used to control the internal atmosphere.

Preferably, the furnace comprises a system for tapping molten material.

In accordance with a first variant, the furnace comprises a run over pouring located below the surface of the bath and the furnace is tapped in continuously way.

In accordance with a second variant, the furnace comprises a run over pouring located above the surface of the bath, it being possible to rock the furnace, tapping occurring by overflow from the upper part of the furnace.

In accordance with a third variant, the lower part of the furnace comprises a down pouring channel.

In accordance with a first embodiment, the installation for treating the fumes comprises a post-combustion chamber which is connected to the furnace by a gas removal duct.

Preferably, a deduster, such as a cyclone, is provided at the outlet of the post-combustion chamber.

Preferably, if the formation of metal oxides is avoided during melting, this installation comprises systems which can directly recover the metals contained in the fumes, these devices being placed at the outlet of the furnace or at the outlet of the post-combustion chamber.

Advantageously, if a chlorine compound is present in the gases to be treated, a gas scrubber can be provided at the outlet of the cyclone or metal recovery device.

Preferably, the installation also comprises another deduster, such as a cyclone, which is connected to a stack through which the gases released by this system escape into the atmosphere.

In accordance with a second embodiment, the installation for treating the fumes comprises a wet cyclone, the fumes from said cyclone being sent to the existing fumes purification system in the incineration plant.

The invention will be better understood and other advantages and characteristics will appear more clearly from the following non-limiting description of a number of embodiments of the invention. It should be read in conjunction with the attached drawings, in which.

Figure 1:
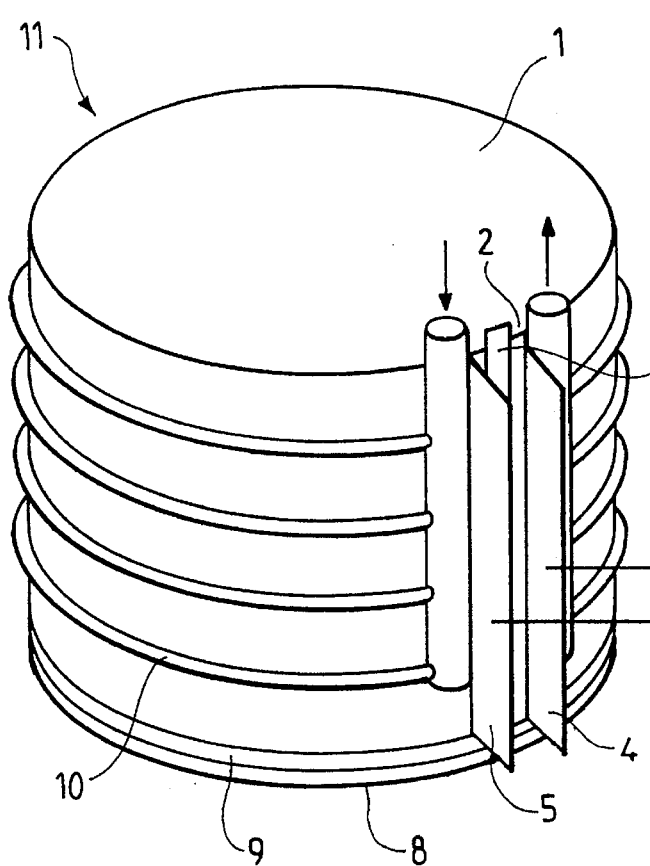
FIG. 1 shows a first electromagnetic induction furnace suitable for implementing the process in accordance with the invention.

Elements common to the different figures are designated by the same reference numbers, The furnace shown in FIG. 1 is a "direct winding inductive skull crucible" type furnace and can be used in the process and device of the invention. Such furnaces have already been described in the prior art section and are described in French patent No. 1.430.192 which shall be referred to here.

The furnace 11 comprises a coil (cylinder) 1 constructed of sheet metal that is a good conductor of electricity and heat, such as copper. The cylinder comprises a discontinuity 2, for example a narrow slot located between two generating lines. This discontinuity is primarily electrical, i.e. the space between the two generating lines is sealed by an electrically non-conductive rectangular body 3. A channel conveying a liquid coolant may run through said body 3 in order to cool said body 3. The metal cylinder and body 3 together form a continuous inner wall.

A plate 4, 5 that is a conductor of electricity is fixed to each edge of slot 2 of metal cylinder 1. This resulting assembly forms a metal coil through which electric current can flow. The two conducting plates 4, 5 are connected to a power source (medium-frequency current generator) 6 and possibly to means such as capacitor 7 intended to compensate for the reactive energy consumed during the process described below.

The lower part of this cylindrical assembly rests on a bottom 8 comprising a circular plate made of metal or refractory material. If bottom 8 is made of metal, a ring 9, made of an electric insulating material, provides a seal between cylindrical wall 1 and bottom 8. A channel conveying liquid coolant may pass through the ring in order to cool the ring.

The assembly format by coil 1 and bottom 8 is surrounded by a coil 10, 10' fixed to the outer wall 1 of cylinder 1 and bottom 8. A liquid coolant, for example water with a low mineral content, flows through the coil continuously. The coolant flow direction is indicated by arrows F1 and F2.

The operating principle of the furnace is as follows: materials such as waste, particularly in powder or granular form, are loaded into the volume formed by coil 1 and bottom 8. At the temperature considered, the resistivity of these materials is relatively high.

Single turn coil 1, connected to generator line 6, is the seat of a.c. electric power which creates a medium-frequency alternating field inside the cylindrical volume which induces eddy currents into the material. By choosing an appropriate frequency, and providing that the reactive energy compensating means contribute efficiently towards the production of reactive energy, a large part of the energy transmitted by generator 6 is dissipated by the eddy currents in the material, whose enthalpy rises.

This furnace is therefore able to melt the waste introduced into it. Indeed, the waste contains oxides, particularly $SiO_2$, $Al_2O_3$ and $CaO$, which have the property of progressively melting, passing through the pasty state, and to passing through the superheated state during cooling or of remaining in this state. They also have the property of conducting electricity in the pasty or liquid state, for example above 1100° C., whereas they do not conduct electricity in the solid state.

When the furnace is in operation and the material it contains is in the liquid or semi-liquid state, a protective skin of vitrified material forms in the central part owing to the cooling of the walls. This film (skull) electrically insulates the wall from the product being melted and provides effective sealing against leaks.

This skull serves as a crucible, making it unnecessary to provide a refractory vessel. This helps to overcome the drawbacks discussed earlier connected with the use of a refractory vessel. Note that a partial melting of the protective skin in the fusion bath does not compromise the operation of the furnace since it is of the same composition as the bath.

Electromagnetic induction heating also avoids the need for heating elements which are subject to wear and must be replaced.

Furthermore, electromagnetic induction heating does not require the use of gas. The fumes therefore only consist of released vapors and represent a small volume, thus avoiding the need to install bulky fume treatment equipment, and making it possible to send these fumes, if necessary, into the incinerator's fume circuit without requiring modifications.

Another advantage of electromagnetic induction heating is consistent temperature since the heat energy is generated in the core of the material placed in the furnace and is accompanied by spontaneous mixing, This prevents the formation of hot spots which give rise to undesirable chemical reactions that release pollutant chemical compounds or elements, particularly chlorine compounds and volatile heavy metals. This furnace therefore overcomes the drawbacks identified in already known processes and which all lead to the formation of hot spots.

The induction furnace used has other advantages compared to other types of induction ovens which could be used in known treatment processes.

First, the furnace generates the heat directly in the materials to be heated. Thus, the wall of the furnace is not the seat of eddy currents which would result in losses- No loss results from the transmission of heat from the crucible to the material.

Furthermore, single turn coil 1, which constitutes the inductor of the induction furnace, is galvanically connected to the power source, which is not the case of segmented cold crucibles. This results in an efficiency of about 85% which is much higher compared to segmented cold crucibles.

Note that the power source may, as is customary, comprise an impedance matching or galvanic isolation system. In this patent application it is considered that these systems form an integral part of the power source and have little effect on efficiency.

Thus, even in the case where power source comprises such systems, it is considered here that the connection between the power source and inductor circuit of the furnace is galvanic and without losses.

It is also advantageous to include a wall made from a refractory material on the inner wall of the cylinder. This arrangement makes it possible in particular to reduce losses. This wall made from refractory material does not require frequent replacement since it is protected by the skin of solid material which forms when the furnace is in operation. The material chosen is a non-conductor of electricity in the molten state. Since it is not the seat of eddy currents, there are no losses.

Figure 2:
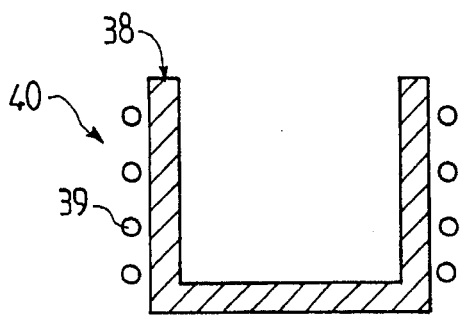
FIG. 2 shows a second electromagnetic induction furnace suitable for implementing the process in accordance with the invention.

The furnace shown in FIG. 2 is of the "skull crucible" type and may also be used in the process and device of the invention. This furnace 40 comprises a crucible 38 made from a refractory material such as silica or alumina that is not a conductor of electricity in the solid state, as well as a solenoid 39 surrounding the crucible and provided with appropriate cooling means. The refractory material is chosen according to the materials to be processed.

Crucible or hearth 38 is not therefore the seat of any loss, the induction being generated by solenoid 39 directly in the mass to be melted. Furthermore, solenoid 39, which constitutes the inductor circuit, is galvanically connected to a power source, not shown on FIG. 2.

The comments made in connection with the furnace shown in FIG. 1 also apply to the furnace just described. Thus, even if the power source comprises the customary impedance matching or galvanic isolation systems, the connection between the inductor circuit and power source is considered to be galvanic.

Note that if the waste to be treated is not at all or insufficiently self-fluxing, i.e. when raised to high temperature, it does not liquefy or does so only with difficulty, additives are then added. These additives are commonly called fluxes, and make it possible to achieve better melting or overt total verification, thus allowing the formation of a final, homogenous, non-leachable product.

These additives can, for example, be cullet from used glass, sand, borax, sodium carbonate, potassium carbonate or even phonolite.

If the waste contains a high proportion of chlorides, two phases can be formed, the first composed mainly of mineral oxides, and a second phase composed mainly of salts and of lower density than the first phase.

It may be advantageous in certain cases to operate the furnace in a controlled atmosphere, particularly in order to reduce leaks of hazardous gas or control chemical reactions occurring in the furnace.

To achieve this, a cover must be provided to enclose the space inside the furnace. Such a cover is riot shown in FIGS. 1 and 2, but is shown under reference 12 in FIGS. 3, 4 and 5. FIGS. 3 to 7 comprise a furnace such as that illustrated in FIG. 1. A furnace as shown on FIG. 2 can also be provided.

The following elements then pass through cover 12: at least one duct 13 for feeding the waste and any additives required, at least one duct 14 for removing the gases released during the melting of the waste and at least one duct 15 for injecting gas used to control the internal lo atmosphere. This cover is preferably protected by an inner wall, suitably equipped to provide protection against heat radiation, the chemical action of the gases and molten material spattering. This cover must not electrically short circuit the single turn coil 1 of the furnace 11.

The merits of operating this furnace semi-continuously are quite evident since it avoids continually stopping the melting process. When removing the molten products, a sufficient volume of material is kept in fusion to sustain the melting process.

Figure 3:
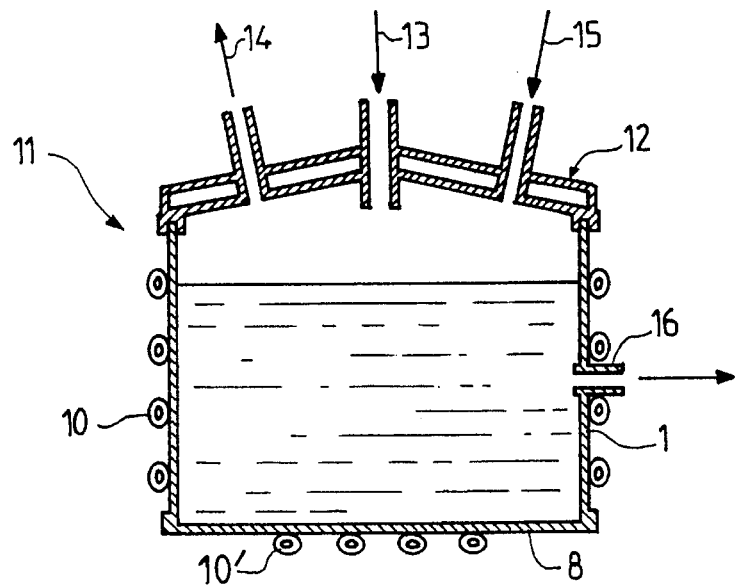
FIG. 3 shows a first alternative embodiment for removing the molten products.
Figure 4:
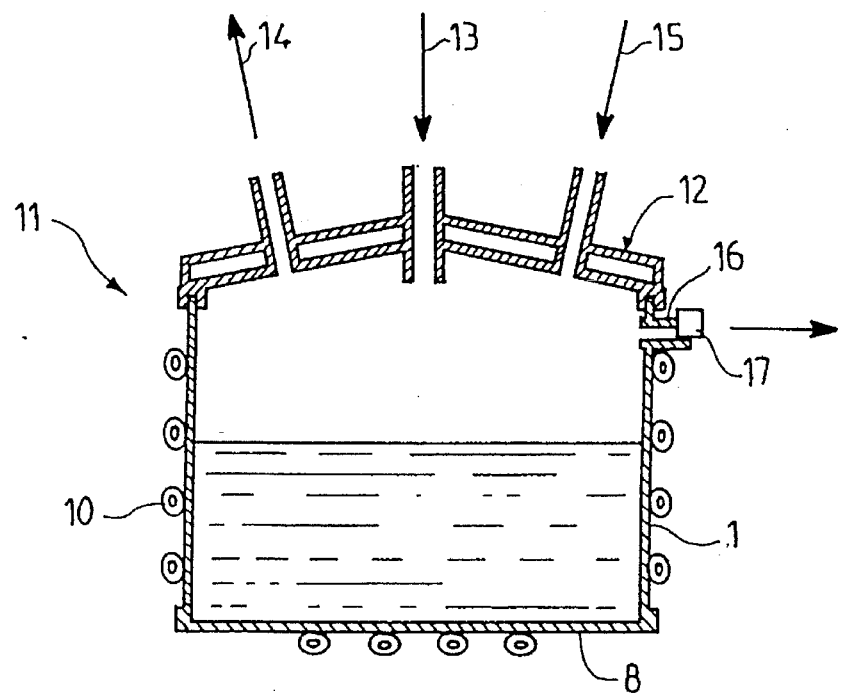
FIG. 4 shows a second alternative embodiment for removing the molten products.
Figure 5:
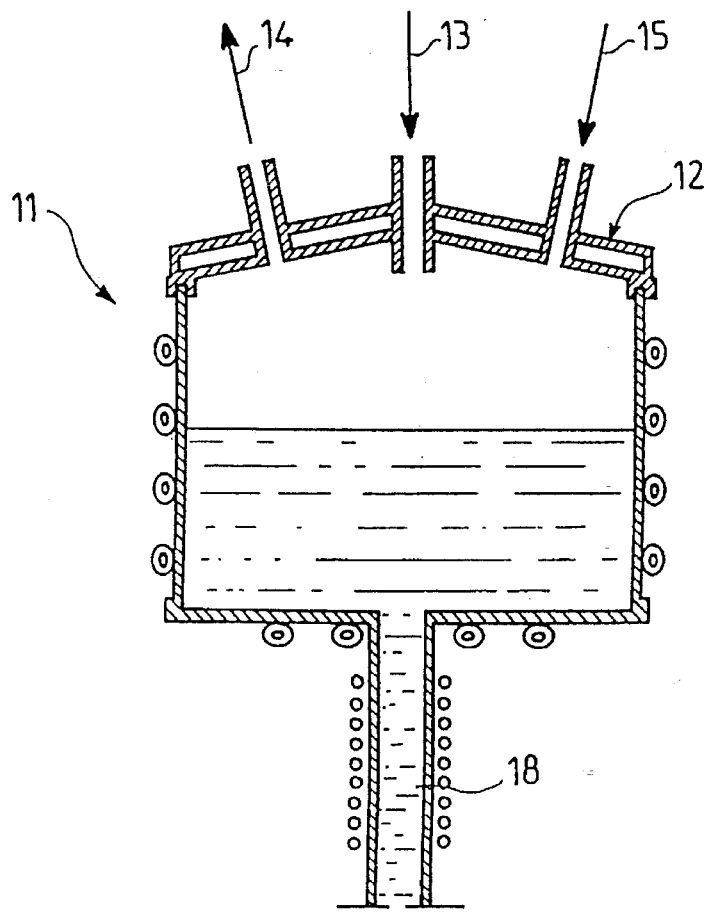
FIG. 5 shows a third alternative embodiment for removing the molten products.

FIGS. 3 to 5 show different systems for removing the molten material. By reference to FIG. 3, cylindrical wall 1 is provided with a run over pouring 16 located below the surface of the bath, This run over pouring makes it possible to remove products without emptying the furnace and thus sustain the melting processes. Removal is continuous performed by overflow. By reference to FIG. 4, run over pouring 16 is located above the surface of the bath and it is closed by a removable plug 17. The molten material is extracted by rocking the furnace and bringing the open run over pouring to the surface of the bath, while at the same time preventing the bath from completely emptying and stopping the melting process. Removal can be periodic or, preferably, continuous, a continuous stream being removed from the top of the furnace by overflow. FIG. 5 shows an alternative arrangement for the removal means. These means consist of a pouring channel 18 through which the molten products flow continuously.

For waste with a high chloride content for which two phases are formed, appropriate means are required to pour the first phase mainly containing mineral oxides, independently of the second phase made up mainly of salts.

The molten material extracted from the furnace cools and solidifies. In the embodiment shown in FIG. 5, solidification occurs continuously in the down pouring channel. If the molten matter is not cooled abruptly, it spontaneously splits to form gravel. If cooling is abruptly applied, it breaks up into small fragments to form sand.

The coil system used to cool the furnace walls described by reference to FIG. 1, which cools cylindrical wall 1 and bottom 8, can also be used to cool cover 12 and possibly down pouring channel 18. This cooling system is connected to a heat exchanger system with a cold source and to a processing unit which maintains its electrical characteristics.

Any isolating chambers or shut-off valves that may be required are not shown in the figures.

In a known way, the melting process in the furnace can be initiated by temporarily introducing a conductor that is a conductor of electricity when cold, with the waste to be melted. The conductor must be electrically and chemically compatible with the installation and the materials for which it is designed. Zirconium or graphite can be mentioned as examples.

Figure 6:
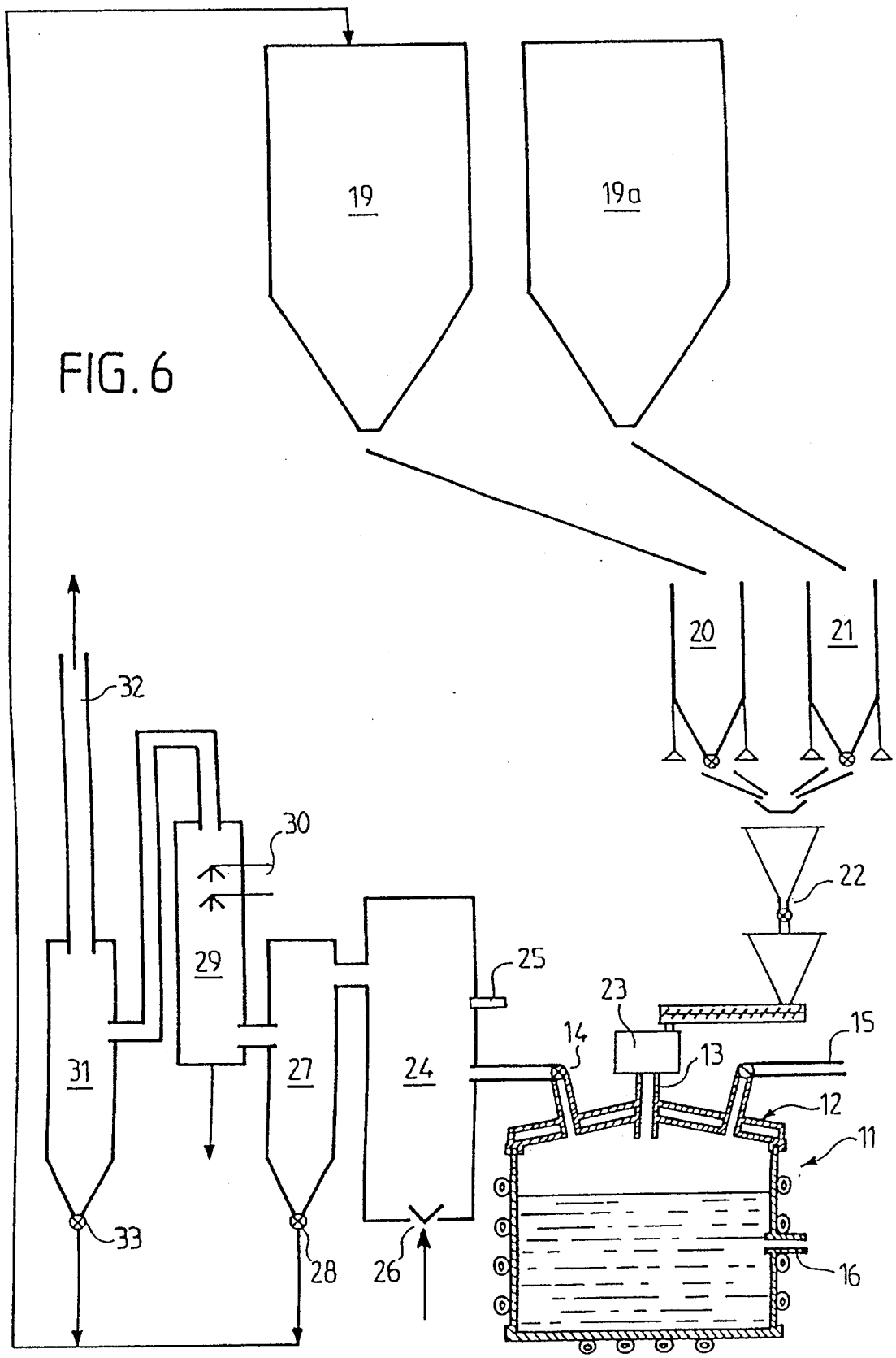
FIG. 6 shows a complete waste treatment device in accordance with the invention.

Reference will now be made to FIG. 6 which shows a complete waste treatment system in accordance with the invention, Furnace 11 shown in FIG. 6 corresponds to the alternative embodiment shown in FIG. 3, i.e. in which the molten material is extracted by overflow. It will be readily understood that the furnaces shown in FIGS. 4 and 5, i.e. those in which the molten material is extracted either by rocking the furnace or by continuous down pouring, can be substituted for the furnace shown in FIG. 6.

The key component of this system is the furnace which has already been described in detail in relation to FIGS. 1 and 3 to 5 and will not therefore be described again.

The treatment system first comprises storage hoppers. Two hoppers are shown in FIG. 6, identified by references 19 and 19a. One of these hoppers contains the waste which may be in the form of powder or granules, and the second contains the additives, the role of which has already been explained. The materials contained in these two hoppers 19 and 19a are sent to two weighing hoppers 20 and 21, one of which is used for the waste and the second for the additives, the contents of these two hoppers 20 and 21 are poured into a double-hopper system 22 provided with a pneumatically controlled valve or cellular lock chamber. This system serves to feed the material into the furnace without any leakage of gas, even if a pressure difference exists between the upstream and downstream sides of this system 22. The material leaving system 22 is brought to the means 23 for introducing the solid material into the furnace. This material enters the furnace via duct 13.

As already explained, once the melting process has been started, the material intruded into the furnace is liquefied and continuously extracted by overflow, the molten material flowing out via the run over pouring 16 located below the surface of the bath of molten products.

Gas can be introduced through duct 15 to control the internal atmosphere of the furnace.

The gas released during the melting of the waste is removed through duct 14.

The gases are first sent into a post-combustion chamber 24 in which any inflammable gases formed in the furnace if the waste contains organic matter, which is virtually always the case, are burned off.

Reference 25 corresponds to a gas burner which is provided to turn off these gases. A system 26 can also be provided to supply air to he post-combustion chamber 24.

After the post-combustion chamber 24, a deduster is provided, such as a cyclone separator 27, to settle the dust discharged by the furnace. This dust generally comprises metal oxide or unoxidized metal dust. This dust is a pollutant and is recovered at the bottom 28 of the cyclone. If necessary, it can be upgraded later by retreatment for subsequent use. It can also be fed back to hopper 19 and recycled to the system. An electrostatic precipitator can also be provided to increase the efficiency of the cyclone, such a precipitator not being shown in FIG. 5.

A gas scrubber 29 is provided at the outlet of cyclone 27. This device is required if a chlorine compound remains in the gas to be treated. This gas scrubber is used to lower the temperature of the fumes and to dissolve the acids formed in the melting and post-combustion stages. These acids, for example $HCl$ and $H_2SO_4$, can then be neutralized in aqueous solution by suitable chemicals and there recovered in the form of salts. Reference 30 designates the means for introducing the aqueous solution.

After gas scrubber 29, another deduster such as cyclone 31 can be provided. The cyclone is used to further purify the gases released by the system and which finally leave the cyclone via stack 32. The dust is recovered at the bottom 33 of the cyclone 31. If necessary, it can be upgraded later by retreatment for subsequent use or, alternatively, fed back to hopper 19 and recycled to the system. Cyclone 31 is not necessarily present in the treatment system of the invention.

The use of systems based on adsorption on activated charcoal or on lignite coke can also be envisaged. These devices operate either by injecting the adsorbent into the fumes, or by sending the fumes through filters made up of adsorbent layers.

Devices different from cyclone 27 can be envisaged for recovering metals present in the fumes released by the furnace. These devices can be used either in place of or as a supplement to cyclone 27. In this case, the formation of metal oxides is prevented beforehand by careful choice of the composition of the furnace atmosphere and the post-combustion stoichiometry. In this way, the metals which evaporate in the furnace remain in the uncombined state and can condense to the "metal" state.

Systems are also known which comprise a wheel that creates a curtain of liquid lead by turning in a lead bath. Gases containing zinc pass through the curtain, the zinc being dissolved in the lead. These devices are placed at the outlet of the furnace or possibly at the outlet of the post-combustion chamber. The metals dissolved in the base metals are then separated by fractional distillation.

Systems are also known in which the gases are brought into contact with metallic dust in a zone kept at below 250° C. by means of a heat exchanger. This metallic dust, approximately of the same composition but cold, is used to activate condensation. The dust is then separated in a cyclone. After cooling, part of the dust recovered in the cyclone is re-injected into the coalescence zone to sustain the condensation process.

Figure 7:
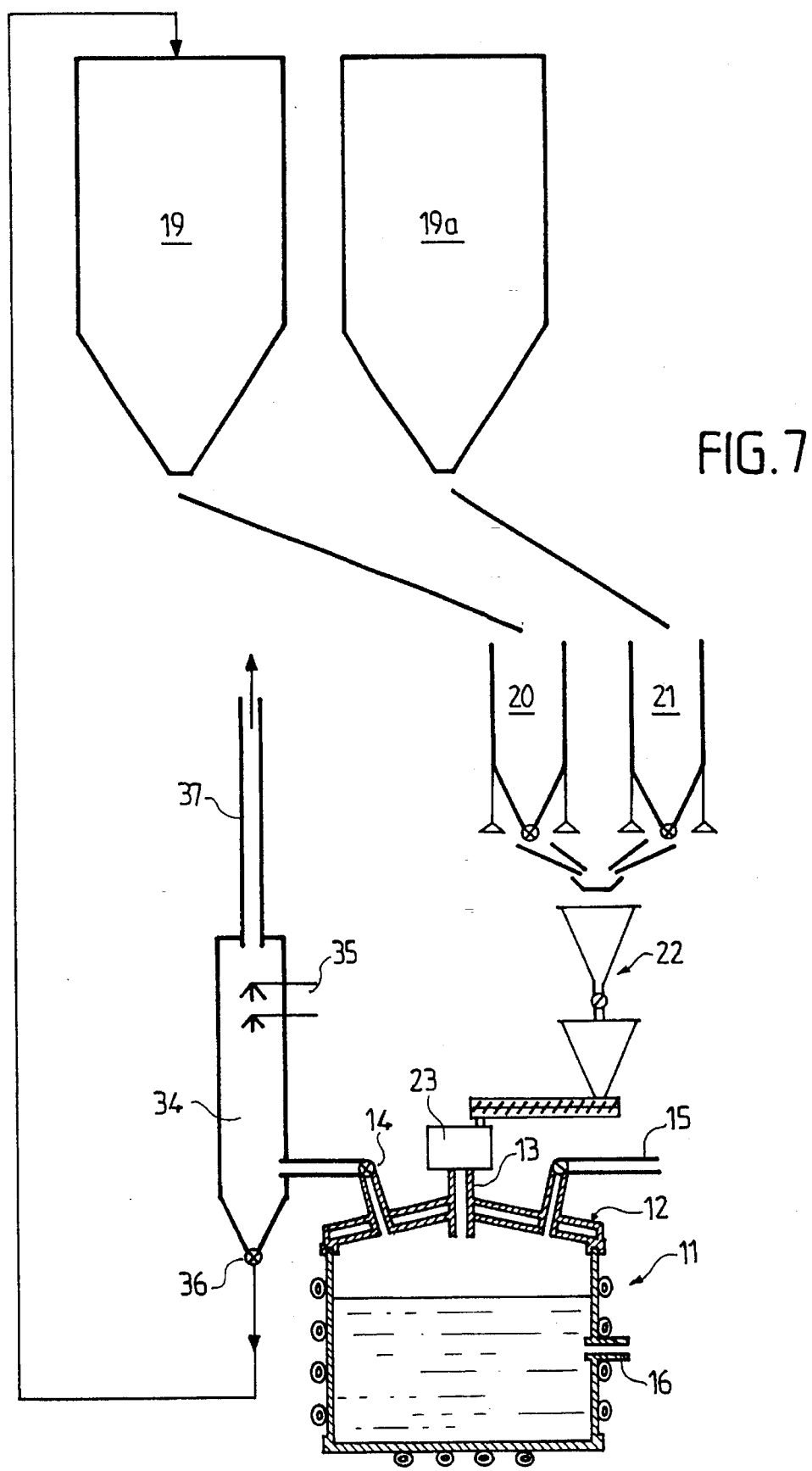
FIG. 7 shows a treatment system in accordance with the invention using an incineration plant's conventional fume purification equipment.

If the residue treatment device is located on the same site as the waste incineration plant, it may be advantageous to use the plant's existing fume purification systems, By reference to FIG. 7, the system in accordance with the invention comprises the same storage and furnace feeding systems and the same furnace as shown in FIG. 6, and will not be described again in detail here.

The fume treatment installation is, however, completely modified. It essentially comprises a wet-process cyclone 34, the means used to supply cooling water to the cyclone identified by the reference 35. This system is also known as a venturi scrubber. The dust is recovered at the bottom 36 of the cyclone 34. It can later be retreated to allow the usual use of the metals or alternatively fed back to hopper 19 and recycled to the system.

The fumes leave via duct 37 and are sent to the incineration plant's existing fume purification systems.

Since electromagnetic induction heating does not require the use of additional gases, the fumes contain only the vapors released. They represent only a small volume, making it possible to send them to the existing fume purification systems without the need to modify said systems beforehand.

It should also be noted that when the furnace is in operation and the materials that it contains are in the liquid or semi-liquid state, a cold crown is formed on the surface of the bath which makes it possible to trap at least a part of the volatile elements, particularly the metals. This phenomena also makes it possible to limit the size of the equipment required to treat the fumes released by the furnace.

Thus, in the complete waste treatment system shown in FIG. 6, the small volume of fumes eliminates the need to provide for bulky fume treatment installations.

References numbers included after technical features indicated in the claims, are only aimed to facilitate understanding of these claims. They do not induce, in any case, a limitation of the invention to the particular described embodiments.

We claim:

1. Process for treating pollutant materials which are fusible and conductors of electricity in the melted state, which process comprises:
   (a) introducing the said materials into an induction furnace comprising an inductor circuit,
   (b) directly heating the said materials by induction in said furnace to ensure their melting, the induction being created by the inductor circuit which is galvanically connected to a power source,
   (c) removing the melted products from the said furnace, and
   (d) cooling the removed products, such that the cooled products are in non-leachable form.

2. The process of claim 1 wherein the introduction of the said materials and the removal of the melted products is performed in continuous fashion.

3. The process of claim 1 further comprising adding additives to the induction furnace to ensure and/or improve the homogeneous melting of the materials, thus allowing the formation of a final, homogeneous, non-leachable product.

4. The process of claim 1 wherein the furnace is operated under a controlled atmosphere.

5. The process of claim 1 wherein fumes released by the furnace are treated.

6. The process of claim 5 wherein the treatment further comprises eliminating inflammable gases formed in the furnace and then recovering metal compounds present in the fumes released by the furnace.

7. The process of claim 6 wherein the formation of metal oxides is avoided during melting and the corresponding metals are directly recovered.

8. The process of claim 5 wherein the fumes are scrubbed to dissolve acid and to recover the acid in the form of salts.

9. The process of claim 5 wherein, in a final stage, the fumes are scrubbed before being released into the atmosphere.

10. The process of claim 5 wherein the treatment further comprises cooling the fumes, recovering dust and condensable particles from the fumes and then sending the fumes to a purification system.

11. Device for treating toxic materials which are fusible and conductors in the molten state, comprising:
   (a) means for introducing the materials,
   (b) an induction furnace comprising an inductor circuit that is galvanically connected to a power source, said furnace directly heating said materials by induction to ensure their melting,
   (c) means for removing the molten products, and
   (d) means for cooling the removed products, such that said cooled products are in non-leachable form.

12. The device of claim 11 wherein the induction furnace is characterized by the formation and the, at least partial, maintenance of a solidified skin around the fusion bath which is cooled on its outer walls.

13. The device of claim 12 wherein the furnace is of the "direct winding self-hearthing" type comprising a metal winding that is a conductor of electricity connected to a medium-frequency current generator, in addition to a bottom, the winding and the bottom being cooled by an appropriate system.

14. The device of claim 13 wherein a wall made from a refractory material that is a non-conductor of electricity in the sold state is placed on the inner wall of the winding.

15. The device of claim 12 wherein the furnace comprises a crucible of refractory material which is not a conductor of electricity in the solid state and inductor means arranged around the said crucible.

16. The device of claim 12 wherein the furnace comprises a cover, ducts then being provided, respectively, for introducing waste, removing the gases released during the melting of the waste, and the injection of gas intended to control the internal atmosphere.

17. The device of claim 12 wherein the furnace comprises a system for removing the molten materials.

18. The device of claim 17 wherein the furnace comprises a pouring lip located below the level of the bath, removal being performed in continuous fashion.

19. The device of claim 17 wherein the furnace comprises a pouring lip located above the level of the bath, it being possible to rock the furnace, removal being effected by overflow from the upper section of the furnace.

20. The device of claim 17 wherein the furnace comprises a pouring channel in its bottom portion.

21. The device of claim 11 wherein it comprises an installation for treating the fumes released by the furnace.

22. The device of claim 21 wherein this installation comprises a post-combustion chamber which is connected to the furnace by the gas removal duct.

23. The device of claim 22 wherein a deduster is provided at the outlet of the post-combustion chamber.

24. The device of claim 21 wherein the said installation comprises, if the formation of metal oxides is avoided during melting, systems which can directly recover the metals contained in the fumes, these devices being placed at the outlet of the furnace or at the outlet of the post-combustion chamber.

25. The device of claim 11 wherein a gas scrubber is provided at the outlet of the cyclone.

26. The device of claim 23 wherein the said installation also comprises another deduster to which a chimney is connected through which the gases released by the device escape.

27. The device of claim 21 wherein this installation comprises a wet-cyclone, the fumes escaping from the said cyclone being sent to the incineration plant's existing smoke purification system.

28. The process of claim 1 wherein a solid crown is formed on the surface of the bath which makes it possible to trap at least a part of the volatile elements, particularly the metals.

29. The device of claim 11 wherein said means for introducing the materials also introduces additives.

30. The device of claim 13 wherein the metal winding is further connected to reactive energy compensating means.

31. The device of claim 23 wherein the deduster is a cyclone.

32. The device of claim 24 wherein a gas scrubber is provided at the outlet of the metal recovery device.

* * * * *